United States Patent [19]

von Haas

[11] 4,275,507
[45] Jun. 30, 1981

[54] DEVICE FOR AUTOMATIC MEASUREMENT FOR ENGAGEMENT PITCH OF THE THREAD ON SCREW-LIKE WORK PIECES

[75] Inventor: Rainer von Haas, Geesthacht, Fed. Rep. of Germany

[73] Assignee: Firma Wilhelm Fette GmbH, Schwarzenbek, Fed. Rep. of Germany

[21] Appl. No.: 167,321

[22] Filed: Jul. 10, 1980

[30] Foreign Application Priority Data

Jul. 25, 1979 [DE] Fed. Rep. of Germany ....... 2930078

[51] Int. Cl.³ ............................................. G01B 7/28
[52] U.S. Cl. ................................ 33/199 B; 33/199 R; 33/179.5 R
[58] Field of Search ......... 33/199 R, 179.5 R, 147 M, 33/199 B, 179.5 D

[56] References Cited

U.S. PATENT DOCUMENTS

| 2,992,491 | 7/1961 | Höfler | 33/179.5 R |
| 3,122,839 | 3/1964 | Muller | 33/179.5 R |
| 3,324,562 | 6/1967 | Kelso | 33/199 B |
| 3,945,126 | 3/1976 | Bloch | 33/179.5 R |
| 4,170,830 | 10/1979 | Weber | 33/179.5 R |

FOREIGN PATENT DOCUMENTS 390036  9/1924  Fed. Rep. of Germany ......... 33/199 B Primary Examiner—Willis Little
Attorney, Agent, or Firm—Michael J. Striker

[57] ABSTRACT

The device for measuring the engagement lead of the thread of a screw-like work piece, such as a hob, for example, includes a spindle for rotating the work piece about an axis, a measuring slider movable transversely to the axis and terminated with a feeler which is in sliding contact with a flank of the thread of the work piece whereby the path of movement of the measuring slider is angularly adjustable, a sliding carriage supporting either the measuring slider or the work piece to impart a relative axial displacement therebetween, a tachometer generator coupled to the axially movable sliding carriage to generate a signal proportional to the speed of the axial displacement, a sinusoidal potentiometer mechanically coupled to the measuring slider and to an angle measuring and adjusting device to adjust the angular position corresponding to the base lead angle of the thread of the work piece, the output of the tachometer generator being connected via the sine potentiometer to the electromotor for dirving the measuring slider so that the transverse feed of the latter is proportional to its relative axial displacement whereby the deviations from the preset lead angle are continuously recorded.

10 Claims, 3 Drawing Figures

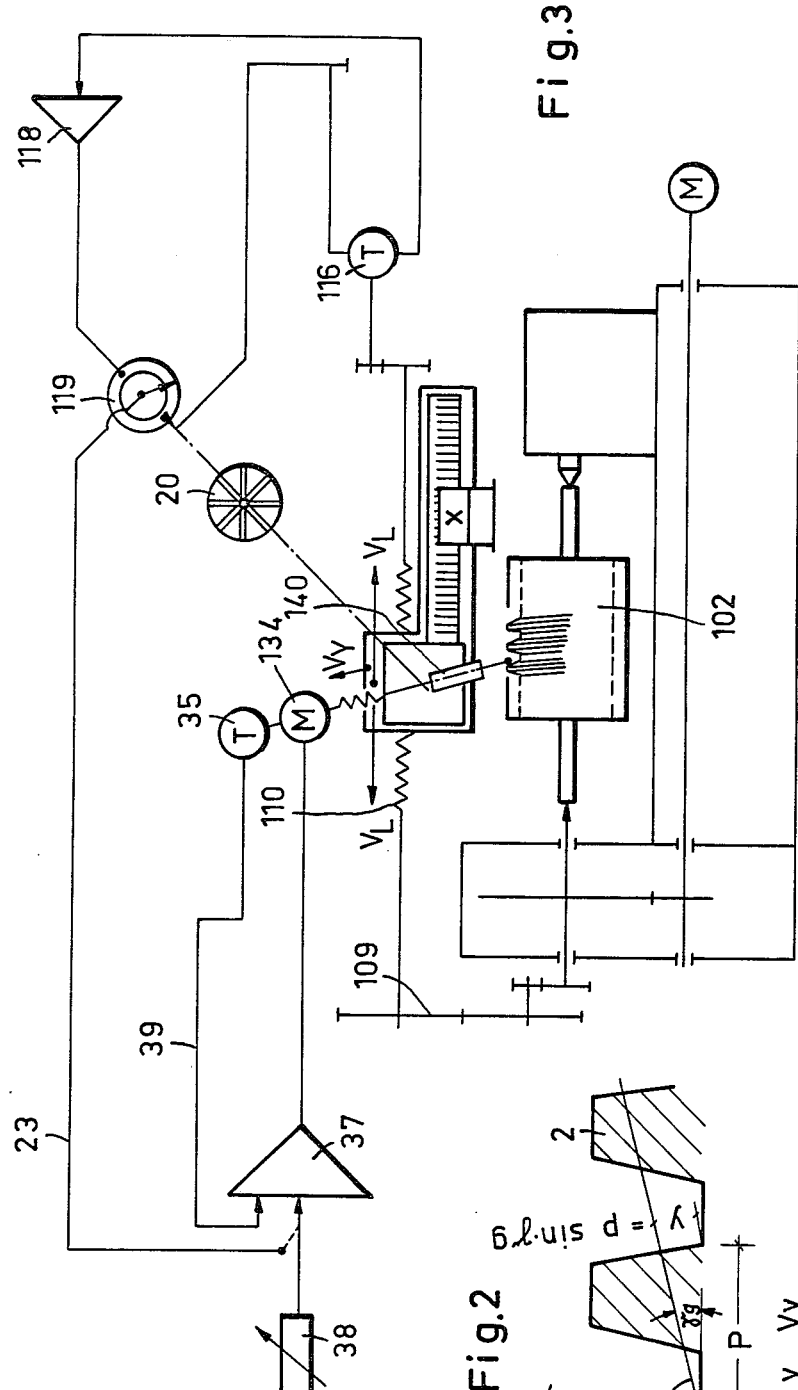

DEVICE FOR AUTOMATIC MEASUREMENT FOR ENGAGEMENT PITCH OF THE THREAD ON SCREW-LIKE WORK PIECES

BACKGROUND OF THE INVENTION

The present invention relates in general to devices for measuring the normal or engagement pitch of helical threads, and in particular to a device for the automatic measurement of the engagement pitch or lead of helical thread of a work piece which is fixed on a rotary work spindle of a machine whereby the helical thread of the work piece is in sliding contact with a feeler which in turn is fixed on an angularly adjustable measuring slider moving transversely to the rotary axis of the work piece and being axially displaceable relative to the latter; a sensor for generating electrical signals corresponding to the axial relative displacement between the screw-like work piece and the measuring slider is coupled to the drive for the transverse motion of the slider.

In a known device for measuring hobs used for manufacturing spur gears having involute teeth, the measuring feeler or the hob itself is moved according to an accurate predetermined gradient of the thread of the hob. In addition, prior to the sensing of the following hob cutter the feeler is manually adjusted in the direction of the base lead angle $\gamma$ g, for example, by moving the hob by means of a micrometer about a certain length. This manual adjustment, however, is relatively time consuming. In a further development of this known measuring device, the feeler or the hob is displaced according to an exactly determined effective pitch of the hob by means of a rolling rule which is retracted according to the base lead angle $\gamma$ g and thus moving the feeler in the direction of the base lead angle. The rolling rule must have a length which corresponds to the maximum length to be measured and for this reason in designing a measuring device of this type, certain construction compromises have to be made with respect to this limitation. Moreover, even in this known embodiment the time for carrying out the measurements is relatively long.

SUMMARY OF THE INVENTION

It is, therefore, a general object of the present invention to overcome the aforementioned disadvantages.

More particularly, it is an object of the invention to provide an improved device for measuring the engagement pitch of the threads of a screw-like work piece, such as a hob, in which the feeler of the measuring slider upon the adjustment of a pre-set working position of the slider is automatically moved in the direction of the base lead angle $\gamma$ g at a feeding speed which depends on the lead angle without the need of additional adjusting manipulation when a different base lead angle $\gamma$ g is set.

In keeping with this object, and others which will become apparent hereafter, one feature of the invention resides in the provision of a tachometer generator coupled to the drive for the axial displacement of the work piece relative to the measuring slider to generate a signal proportional to the axial relative displacement of the two members, whereby the measured signal is fed via a sinusoidal potentiometer to the driving motor for the transverse movement of the measuring slider.

The solution according to this invention originates from the generally known fact that due to the geometry of the hob or of another screw-like work piece, the displacement of the measuring slider which is necessary for feeling a flank of the helical thread of the work piece in order to test the same, is dependent on the base lead angle $\gamma$ g and on the axial pitch p of the hob. That means that the feeding speed $V_Y$ of the measuring slider is dependent on the speed of the relative axial displacement $V_L$ of the hob to be tested and on the base lead angle $\gamma$ g of the helical thread of the hob. Furthermore, from the geometry of the cylindrical hob it results that $\sin \gamma\ g = V_Y/V_L$ and that $V_Y = V_L \cdot \sin \gamma\ g$. From these equations, it is evident that the feeding speed of the measuring slider in the transverse direction relative to the axis of rotation of the hob is dependent on the axial feed $V_L$ of the hob (which is measured by the tachometer generator) on the one hand and on the sine value of the base lead angle $\gamma$ g on the other hand. This base lead angle $\gamma$ g is determined by the thread of the screw-like piece to be measured and in the device of this invention can be automatically determined by an angle measuring device or by an angle measuring and angle adjusting device; by adjusting this pre-set base lead angle in the device of this invention, a corresponding position of a sinusoidal potentiometer and the angular position of the track of the measuring slider are also correspondingly adjusted so that the signal voltage applied from the tachometer generator via a sinusoidal potentiometer to the driving motor for the measuring slider corresponds to the product of the speed of relative axial displacement $V_L$ of the hob and of the sine value of the base lead angle $\gamma$ g.

The novel features which are considered as characteristic for the invention are set forth in particular in the appended claims. The invention itself, however, both as to its construction and its methods of operation, together with additional objects and advantages thereof, will be best understood from the following description of specific embodiments when read in connection with the accompanying drawings.

BRIEF DESCRIPTION OF THE DRAWINGS

FIG. 2 is a cut away sectional side view of a helical thread of a cylindrical work piece; and FIG. 3 is a schematic diagram of another embodiment of the device of this invention.

DESCRIPTION OF THE PREFERRED EMBODIMENTS

Figure 1:
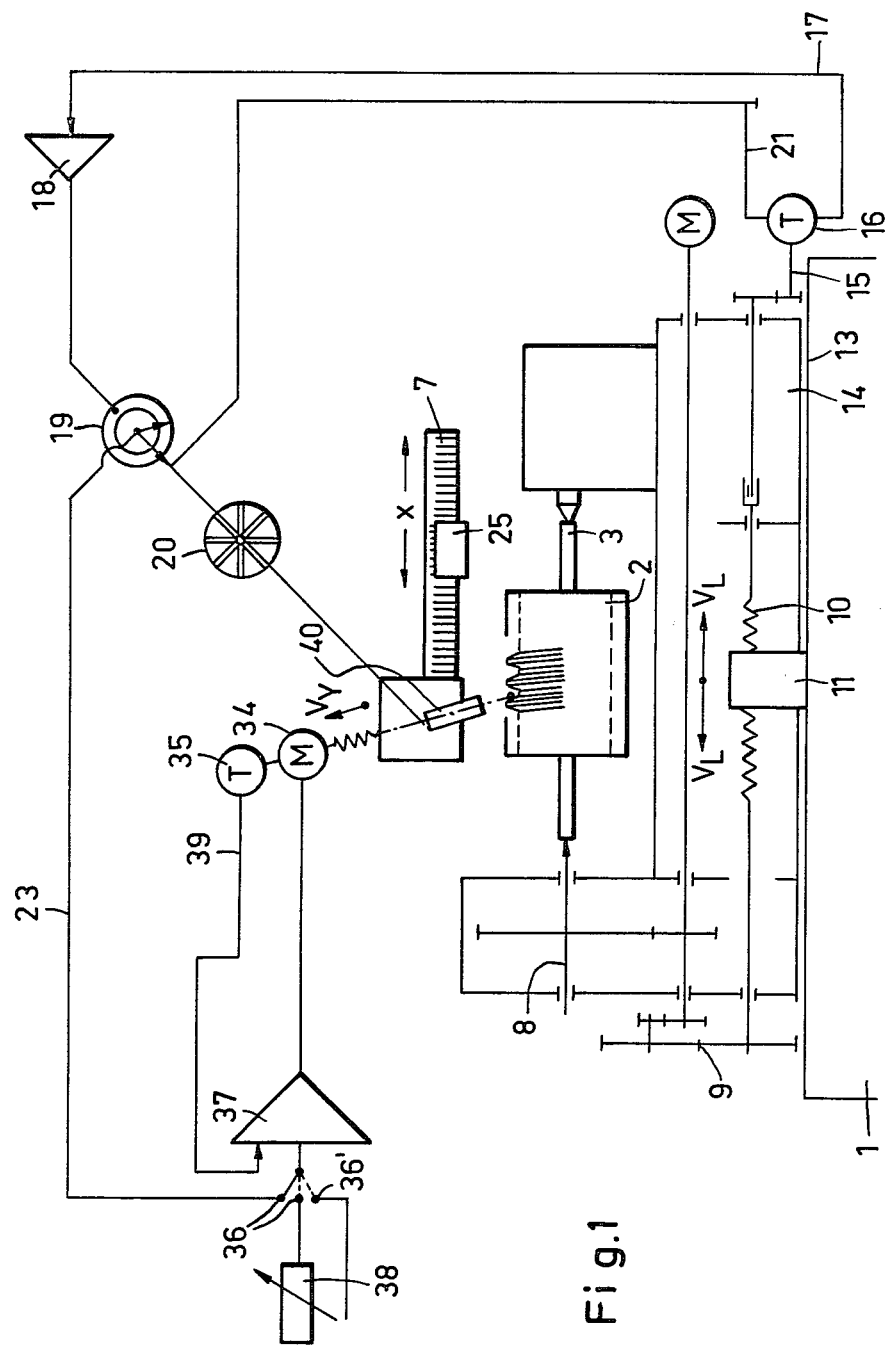
FIG. 1 is a schematic diagram of one embodiment of the device for an automatic measurement of the engagement pitch of the helical thread of a work piece.

FIG. 1 depicts schematically a device for measuring the engagement pitch of the thread of hobs for manufacturing spur gears with involute teeth. Nonetheless, the same device is also suitable for the automatic measurement of the engagement pitch of other screw-like work pieces.

The device includes a stationary bench 1 supporting a longitudinally displaceable elongated sliding carriage 14 which in turn supports a rotary work spindle 3 together with its driving and transmission gears 8. The screw-like work piece 2 to be measured is clamped to the work spindle 8 to rotate jointly therewith. Transmission gears 8 of the work spindle are driven by electromotor M.

The longitudinal sliding carriage 14 also includes a driving spindle 10 which is in mesh with a nut 11 fixedly mounted on the bench 1. By rotating the driving spindle 10 in the nut 11, the whole carriage 14 is displaced in the direction of the axis of rotation of the spindle 8 and thus of the measured work piece 2. If the rotary speed of the driving spindle 10 is measured, it is possible to compute from this measurement the speed of the axial displacement of the longitudinal sliding carriage 14 and thereby of the work piece 2. For this purpose, a tachometer generator 16 is coupled via shaft 15 and transmission gears 9 to the spindles 10 and 8 and the output signal from the generator 16 corresponding to the speed of the axial displacement $V_L$ of the longitudinal carriage 14, is applied via conductor 17 to an amplifier 18. In the amplifier, the output signal is amplified three times, for example, and applied to one terminal of a sinusoidal potentiometer 19, the other terminal of which is connected via conductor 21 to the other pole of the tachometer generator 16. The arm of the potentiometer 19 is connected via conductor 23 to the input of another amplifier 37 which, as will be explained below, operates as the so-called four quadrant multiplier. The potentiometer 19 is mechanically connected to an angle measuring and an angle adjusting device 20 which is also mechanically connected to an angularly adjustable measuring slider 40. This mechanical connection between the angle measuring and adjusting device 20, the adjustable measuring slider 40 and the potentiometer 19 is arranged so that upon adjusting a certain angle on the device 20, namely of an angle corresponding to a given base lead angle $\gamma$ g, the sin value corresponding to this angle is automatically adjusted on the potentiometer 19 so that a signal corresponding to the pre-set desired value of the measured angle is applied via the conductor 23 to the amplifier 37. In this manner, it is no longer necessary to manipulate separately the potentiometer 19 and the inclined transverse path of movement of the adjustable measuring slider 40.

Geometrical relationships considered during the measurement of the engagement pitch of a helical thread of a work piece 2 are indicated in FIG. 2. The axial pitch or lead of thread of the work piece is indicated by section p. The normal or engagement pitch Y is measured by moving the feeler or the tip of the measuring slider 40 along the section Y on the flank of the thread of the work piece and consequently the measuring carriage 40 is to be moved transversely to the path of the axial displacement of the work piece 2. The value Y corresponds to the section p·sin $\gamma$ g. As far as the feeding speeds in the axial and transverse directions are concerned, the following equations are valid: $V_Y = V_L \cdot \sin \gamma$ g, whereby $V_L$ denotes the speed at which the work piece is displaced in axial direction about the length p whereby simultaneously the measuring slider is moved at a speed $V_Y$ in the direction $S_1$ of the thread flank forming the engagement pitch $\gamma$ g.

If the feeler 41 of the measuring slider 40 is now moved in sliding contact with a flank of the thread along the line $S_1$ (FIG. 2), that means, at an engagement lead angle $\gamma$ g formed with the perpendicular to the axis of the work piece 2 and at a speed $V_Y$, it can be seen that sin $\gamma$ g = $V_Y/V_L$ which corresponds to the relationship $V_Y = V_L \sin \gamma$ g. The angle $\gamma$ g of the thread of the work piece 2 can be ascertained, upon the clamping of the work piece on the work spindle 3, by the angle measuring device 20 and, as mentioned above, this angle is automatically adjusted on the sinusoidal potentiometer 19. For instance, if the engagement lead angle is 30°, prior to the activation of the device of this invention this angle is adjusted on the angle measuring device 20 and this angle is simultaneously adjusted on the driving path for the measuring slider 40 and on the angular position of the potentiometer 19. If the tachometer generator 16 upon activation of the driving motors M and 34 now generates an output signal $X_1$ which is proportional to the rotary speed of the driving spindle 10 and thus to the speed of the axial displacement $V_L$ of the work piece, so as mentioned above, this signal is multiplied by three in the amplifier 18 and the output signal 3 $X_1$ is applied to a terminal of the potentiometer 19. The other terminal of the potentiometer is connected via the conductor 21 to the grounded pole of the generator 16. Due to the fact that the sinusoidal potentiometer has been angularly adjusted by the device 20 to resume a position corresponding to the pre-set base lead angle $\gamma$ g = 30°, and inasmuch as sin 30° = 0.5, a divided signal value of 1.5 $X_1$ is tapped from the arm of the potentiometer and applied as a desired value via the connector 23 to the input of the four quadrant multiplier 37. The four quadrant multiplier or amplifier 37 is known as designed such as to produce at its output positive or negative signals and thus to control the driving electromotor 34 for the carriage 40 for rotation either in one direction or in the opposite direction.

The output of the amplifier or multiplier 37 supplies to the driving motor 34 a driving voltage which determines the speed of displacement $V_Y$ of the measuring carriage 40 and thus of the feeler 41 moving in the direction of the measured flank of the thread of the work piece corresponding to the adjusted lead angle $\gamma$ g. The rotary speed of the electromotor 34 corresponds to the ratio or is proportional to the product of sin $\gamma$ g and to the speed $V_L$ of the axial displacement. Provided that the magnitude of the angle $\gamma$ g is 30°, the magnitude $V_Y$ corresponds to the value of 0.5 $V_L$ because sin 30° = 0.5. In other words, in the given example, the speed of the transverse movement $V_Y$ is half the speed magnitude $V_L$ of the axial movement.

A second tachometer generator 35 is connected to the driving motor 34 for the measuring carriage 40 to serve as a control instrument for driving motor 34. In the event that any minute deviation of the rotary speed of the driving motor 34 occurs, the changed output signal from the generator 35 is applied via conductor 39 to another input of the amplifier 37 so as to increase or reduce the output voltage of the amplifier in order to maintain the desired feeding of the measuring carriage.

If it is desired during the operation of the device of this invention to adjust manually the starting position of the feeler 41, the first input of the four quadrant multiplier 37 is provided with a switch 36 for switching over the conductor 23 to another potentiometer 38 through which a displacement signal is applied to the driving electrometer 34 for setting the feeler on the measuring slider 40 to a desired position. In addition, in a third position of the switch 36, an external nominal signal is applied to the driving electromotor 34 instead of the output from the potentiometer 19.

The drive of the measuring slider 40 formed by an electric motor operating independently from any mechanical forces such as those introduced, for example, by the use of a roll rule, has also the advantage that by employing suitable measuring and controlling devices, the automatic measuring process can be continuously repeated or, if desired, it is also possible to employ the device of this invention for different kinds of measurements, such as, for instance, the measurement of the axial pitch of the thread.

The range of the axial displacement of the work piece 2 relative to the measuring slider 40 in the X direction is indicated by means of a ruler 7 which supports an indicator 25 cooperating with the axially displaceable measuring carriage 40. In this manner, it is possible to adjust the axial position of the feeler 41 before the device of this invention is energized.

Any deviations detected by the feeler 41 on the sliding carriage 40 during the scanning of the thread of the work piece 2 causes a corresponding angular displacement of the angle measuring device 20 and can be recorded by any suitable recording or indicating means not shown in the drawings.

In the embodiment according to FIG. 1, the work piece 2 is simultaneously rotated and axially displaced. It is, however, also possible to rotate the work piece in a stable axial position while the measuring slider 40 performs apart from its transverse movement also an axial displacement relative to the axis of the work piece 2. This axial displacement in the direction of the axis X is again measured by a tachometer generator in the same manner as described before.

This modification is illustrated in FIG. 3. The driving motor M imparts to the work piece 102 only a rotary movement and drives via transmission gears 109 a driving spindle 110 extending parallel to the axis of rotation of the work piece 102 and engaging a nut formed in the measuring carriage 140. In this manner, the feeler on the measuring carriage 140 is moved both in the axial direction and in the transverse direction whereby the aforedescribed relationship between the rotary movement of the work piece and its longitudinal displacement is maintained. The measuring slider 140 is in the embodiment according to FIG. 3 moved back and forth in the axial direction. The speed $V_L$ of this axial displacement is again measured by means of a tachometer generator 116 which similarly as in the preceding example supplies its output voltage to an amplifier 118 and therefrom via a sin potentiometer 119 to the driving motor 134 for controlling the speed of the transverse displacement $V_Y$ of the measuring slider 140.

The remaining component parts of the device according to FIG. 3 correspond in principle and in their function to those in the embodiment of FIG. 1.

It will be understood that each of the elements described above, or two or more together, may also find a useful application in other types of constructions differing from the type described above.

While the invention has been illustrated and described as embodied in measuring the engagement pitch of a hob, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for measuring engagement pitch of a thread of a screw-like work piece, comprising means for rotating the work piece about its center axis; a measuring slider movable in a straight path directed transversely at an adjustable angle to said center axis, said measuring slider including a feeler for slidably engaging a flank of the thread of the work piece; electrical driving means for imparting movement to said measuring slider in said transverse path; means for imparting a relative axial displacement between said measuring slider and the rotating work piece; a sensor coupled to said axial displacement means to generate a signal proportional to the rate of the relative axial displacement; a sinusoidal potentiometer mechanically coupled to said angularly adjustable measuring carriage and being electrically connected to the output of said sensor and to said driving means to adjust the transverse feed of the measuring slider to the rate of the axial displacement; and means coupled to said measuring slider for measuring deviations of said transverse path from the base set angle.

2. A device as defined in claim 1, wherein said measuring means includes a device for measuring and adjusting an angle, said device being mechanically coupled to said potentiometer and to said angularly adjustable measuring carriage.

3. A device as defined in claim 2, wherein said sensor is a tachometer generator coupled to said axial displacement means.

4. A device as defined in claim 3, wherein said work piece is supported for rotation on a sliding carriage displaceable in the direction of the center axis of said work piece and said tachometer generator being coupled to said sliding carriage.

5. A device as defined in claim 3, wherein said measuring slider includes a support which is axially displaceable relative to said work piece, and said tachometer generator being coupled to said support.

6. A device as defined in claim 1, wherein the divided signal from said sinusoidal potentiometer is applied to the driving means via an amplifier.

7. A device as defined in claim 6, further including an additional tachometer generator driven by said driving means for said measuring slider and having its output connected to an input of said amplifier to regulate the output signal of said amplifier which is fed to said driving means.

8. A device as defined in claim 7, wherein said amplifier is a four quadrant multiplier to apply voltage to said driving means the polarity of which depends on the direction of movement of said measuring carriage.

9. A device as defined in claim 6, wherein the input of said amplifier connected to said sin potentiometer is provided with a switch for applying an external control signal to said driving means.

10. A device as defined in claim 9, wherein said external signal is applied via a manually adjustable additional potentiometer.

* * * * *